3,125,480
NEOPENTYL GLYCOL ACRYLATE ESTER
COMPOSITIONS
Wolf Karo, Elkins Park, and Benjamin D. Halpern, Jenkintown, Pa., assignors to The Borden Company, New York, N.Y., a corporation of New Jersey
No Drawing. Filed June 27, 1961, Ser. No. 119,813
6 Claims. (Cl. 156—310)

This invention relates to neopentyl glycol acrylate ester compositions and the process of using them. The invention is particularly adapted in bonding metal surfaces with exclusion of air and will be first illustrated by description in connection therewith.

The invention is an improvement over the acrylate esters, i.e., acrylates and methacrylates of ether group-containing glycols heretofore used for such purpose. With them there has been difficulty in adhering certain metals such as those of zinc, cadmium and tin.

The present invention avoids the ether groups and their tendency to peroxidize on aging, with attendant uncontrolled variation of polymerization characteristics of the ester.

Briefly stated, the invention comprises the herein described composition and process for adhesively bonding surfaces. It comprises, more specifically, neopentyl diacrylate or dimethacrylate as the monomeric material in the adhesive composition.

The formula for neopentyl dimethacrylate illustrates the structure of the monomer. It is

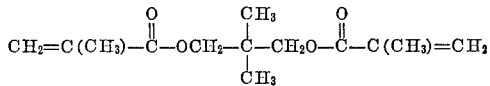

The absence of ether groups in the neopentyl glycol used

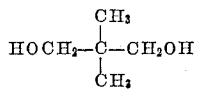

and in the ester will be noted.

Suitable initiators are the organic peroxy initiators of ethenoid bond polymerization of which examples are tertiary-alkyl compounds, e.g., di-tertiary butyl peroxide, tertiary-butyl hydroperoxide, tertiary-butyl perbenzoate, ditertiary-butyl perphthalate, the latter being used in dimethyl phthalate as solvent for the otherwise solid material, methyl ethyl ketone peroxide, cumene hydroperoxide, and di-isopropylbenzene hydroperoxide. Suitable proportions of the initiator are 0.05–20 parts, ordinarily 0.01–10 parts for 100 of the acrylate or methacrylate ester.

The inhibitor used is any commercial retarder of polymerization of monomeric acrylate esters. Hydroquinone is the one that we commonly use. Others that are somewhat less economical or less satisfactory but usable are pyrogallol, quinhydrone and monophenyl, other monoaryl, monobutyl or other mono-lower alkyl ether of hydroquinone. The inhibitors are admixed in usual proportions, as for example, 0.0005–0.5 part for 100 parts of the acrylate or methacrylate ester.

While various accelerators (activators) of the action of the initiator may be used for their usual effects, as for example the cobaltic compounds such as the chloride, ascorbic and isoascorbic acids and various amines such as dimethyl aniline, triethanol amine or triethyl amine, particularly satisfactory results are obtained when the accelerator is benzene sulfinic acid or homologs and analogs thereof, examples of which are toluene sulfinic acid and the sulfinic acid derivatives of mono-chloro-benzene or chloro-toluene.

The accelerator is suitably applied to one of the surfaces to be bonded before the main body of the adhesive is applied thereover. A suitable proportion is about 1%–10% of the accelerator on the weight of the initiator in the resin composition to be applied later.

The method for preparing the acrylate esters herein referred to is illustrated by the procedure for making neopentyl glycol dimethacrylate.

1 mole of neopentyl glycol (104 parts) is mixed with 2.5 moles, a slight excess, of methacrylic acid (215 parts), 0.2 part of hydroquinone, 0.4 part of concentrated sulfuric acid and 300 grams of benzene.

The whole is then boiled under a fractionating column. The water azeotroped out by the benzene is separated in the usual water trap to which the fractionated condensate is delivered and the upper or benzene layer is returned to the still.

When substantially no more water is carried over to the trap, the reaction mass is cooled and washed with water, to remove unused sulfuric acid and a part at least of the remaining excess of methacrylic acid. The washed ester is then mixed with sodium bicarbonate introduced in an aqueous solution of 10% concentration and in amount to neutralize any remaining acidity. The neutralized mixture is then washed again with water. The remaining washed monomeric neopentyl glycol dimethacrylate is then mixed with additional hydroquinone as inhibitor in the amount of 0.002 part.

To make the acrylate ester, 2.5 moles (180 parts) of acrylic acid are substituted for the methacrylic acid in the procedure above.

The neopentyl glycol dimethacrylate and diacrylate esters so made are substantially colorless, mobile liquids.

As to conditions of use of the composition as an adhesive, the selected organic peroxide initiator is mixed into the monomeric acylate ester in any convenient manner and dissolved therein. If the selected peroxide is itself not a liquid at ordinary temperatures, it is dissolved to advantage in a chemically inert solvent therefor such as dibutyl phthalate or a hydrocarbon such as the hydrocarbon which, in oxidation, has given the peroxide. Thus the cumene hydroperoxide would be used in solution in cumene, the cumene solvent being the unoxidized portion of the original cumene which was subjected to oxidation, to make the hydroperoxide.

The bonding of surfaces with the adhesive composition is effected with the exclusion of air, as between a bolt and a nut threaded thereon, and with the adhesive in contact with a divalent or other polyvalent metal.

The invention will be further illustrated by detailed description in connection with the following specific examples of the practice of it. In these examples and elsewhere herein proportions are expressed as parts by weight unless specifically stated to the contrary.

*Example 1*

A composition of 95 parts of neopentyl glycol dimethacrylate containing about 0.005 part of admixed hydroquinone and 5 parts of di-tertiary-butyl peroxide was prepared by stirring the components together. In a half-filled amber bottle, this composition remained fluid for several months.

To test the adhesive properties of this composition, a ¼ inch steel nut was threaded completely into a matching steel bolt. A drop of the composition was applied close to the junction of the nut and bolt. Because of the low viscosity of the composition, a large portion thereof entered the space between the nut and bolt. After six to eight hours, attempts to turn the nut showed that an increase in the viscosity of the liquid composition had taken place. Twenty-four hours after application, polymerization to a hard composition was nearly complete.

When cadmium-plated nuts and bolts were substituted for steel, even after 48 hours, no evidence of polymerization could be observed.

*Example 2*

The composition and procedure of Example 1 are used except that the neopentyl glycol dimethacrylate is replaced by an equal weight of neopentyl glycol diacrylate.

*Example 3*

The procedure of Examples 1 and 2 are used except that a film of benzene sulfinic acid as an accelerator of the peroxide initiator, is applied in aqueous solution to one or both of the surfaces to be bonded before the adhesive composition comprising the acrylate or methacrylate ester along with the peroxide initiator is applied between the two surfaces to be bonded.

All of the compositions including the neopentyl glycol dimethacrylate or diacrylate and including also the hydroquinone and ditertiary butyl peroxide initiator or like inhibitors and initiators are stable in storage for a period of several months. In such storage they do not develop per-compounds as the result of oxidation of an ether group or other component in the said ester in amount to cause uncontrolled variation in the polymerization characteristics of the products after storage.

It will be understood that it is intended to cover all changes and modifications of the examples of the invention herein chosen for the purpose of illustration which do not constitute departures from the spirit and scope of the invention.

We claim:

1. An adhesive comprising a mixture of monomeric neopentyl glycol diester of an acid selected from the group consisting of acrylic and methacrylic acids, an inhibitor of polymerization of ethenoid monomers and an admixed organic peroxy initiator of said polymerization.

2. The adhesive of claim 1, the said acid being methacrylic.

3. The adhesive of claim 1, the said acid being acrylic.

4. The adhesive of claim 1, the said acid being methacrylic, the inhibitor being hydroquinone, the initiator being di-tertiary-butyl peroxide, and the proportions of the inhibitor and initiator being, respectively, 0.0005–0.5 part and 0.05–20 parts for 100 parts of the said ester.

5. The process of bonding metallic surfaces which comprises applying to one of the surfaces an aromatic sulfinic acid and to the other the adhesive of claim 1 and then maintaining contact of the two surfaces with the adhesive therebetween and with restriction of access of air until the monomeric diester polymerizes.

6. The process of bonding metallic surfaces which comprises applying to one of the said surfaces an adhesive comprising approximately 95 parts by weight of neopentyl glycol dimethacrylate, 0.005 part of hydroquinone as inhibitor, and 5 parts of di-tertiary-butyl peroxide as initiator of polymerization, applying to the other of the said surfaces benzene sulfinic acid as an activator of the initiator and in the proportion of about 1%–10% of the weight of the said initiator, and then maintaining contact of the two surfaces, with the materials so applied therebetween and with restriction of access of air, until the said methacrylate polymerizes.

References Cited in the file of this patent

UNITED STATES PATENTS

| | | |
|---|---|---|
| 2,346,644 | Bauer et al. | Apr. 18, 1944 |
| 2,414,414 | Rhodes | Jan. 14, 1947 |
| 2,567,803 | Castan et al. | Sept. 11, 1951 |
| 2,628,178 | Burnett et al. | Feb. 10, 1953 |
| 2,895,950 | Krieble | July 21, 1959 |